United States Patent [19]

Sampson

[11] Patent Number: 5,156,283
[45] Date of Patent: Oct. 20, 1992

[54] WOODEN STEIN WITH RESPONSIVE EMBLEM

[76] Inventor: Susan R. Sampson, 402-B Gillette St., LaCrosse, Wis. 54603

[21] Appl. No.: 740,924

[22] Filed: Aug. 6, 1991

[51] Int. Cl.$^5$ .............................................. B65D 1/04
[52] U.S. Cl. ............................... 215/1 B; 215/100 R; 40/324; 206/457
[58] Field of Search .............. 215/100 R, 1 B, 6, 11.2; 206/217, 457; 40/310, 324, 410, 446; 220/94 A, 85 B, 85 R, 662, 703

[56] References Cited

U.S. PATENT DOCUMENTS

| | | | |
|---|---|---|---|
| 670,993 | 4/1901 | Matthes | 215/1 B |
| 2,464,155 | 3/1949 | Russell et al. | 40/446 |
| 2,587,620 | 3/1952 | Hormann | 40/410 |
| 3,388,490 | 6/1968 | Stechemesser | 40/446 |
| 4,023,289 | 5/1977 | Crawford | 40/410 |
| 4,263,734 | 4/1981 | Bradshaw | 215/100 R |
| 4,555,034 | 11/1985 | Gerhards | 215/100 R |
| 4,919,983 | 4/1990 | Fremin | 215/11.2 |
| 4,928,412 | 5/1990 | Nishiyama | 40/324 |
| 4,932,542 | 6/1990 | Chen et al. | 215/6 |
| 4,941,590 | 7/1990 | Pantaleo et al. | 206/217 |
| 5,029,700 | 7/1991 | Chen | 206/217 |

*Primary Examiner*—Stephen Marcus
*Assistant Examiner*—S. Castellano
*Attorney, Agent, or Firm*—Richard C. Litman

[57] ABSTRACT

A beer stein is made of wood, which imparts no disagreeable flavor to the beer, and creates a faint pleasant aroma. The stein has an insert on its front surface which contains some active display reactive to the environment, such as a thermochromic emblem or a swirling snowflake scene.

5 Claims, 1 Drawing Sheet

WOODEN STEIN WITH RESPONSIVE EMBLEM

FIELD OF THE INVENTION

The present invention relates to beer steins.

DESCRIPTION OF THE PRIOR ART

In the prior art, many inventors have experimented with various materials and various ways of making drinking vessels more amusing.

U.S. Pat. No. 3,256,627 of J. E. Adair shows a drinking glass with windows through which a user may see images imprinted onto the inside surface opposite a respective window.

John Cogswell discloses in U.S. Pat. No. Des. 314,308 a mug having a timepiece mounted into the exterior surface.

C. W. Cahoon, in U.S. Pat. No. 51,141, shows a wooden vessel for liquids such as boot blacking. The vessel is made by axially boring a cylinder of wood and then coating the inside, by pouring in liquid asphalt, sealing wax, shellac, etc., pouring out the liquid, and then allowing the inside to dry. The vessel may be stoppered to close it.

This vessel would not be suitable for drinking beer, due to tainting of the beer by the shellac, asphalt, etc.

U.S. Pat. No. 4,555,034 issued to Ludwig Gerhards shows a beer stein lid made of wood. According to Gerhards, the wooden lid is flavor neutral, and will not impart a disagreeable taste to the beer, as will a metal lid which touches the foamy head. The wooden lid is easily removed for cleaning the stein without subjecting the wood to harsh detergents.

Although this patent addresses one problem of beer steins, it does not address the problem of tainting of the beer proper. The foamy head of the beer is of course only a small part of the total beer within the stein, and is full of air. Thus its contact with a surface is less important than the contact of the mass of beer with the sides of the stein.

T. P. Pick, in U.S. Pat. No. 1,094,469, shows a stein with a removable lid.

Thermochromic compositions, which change color with temperature changes, are disclosed by White et al. in U.S. Pat. No. 4,424,990, and in other patents. These compositions are commercially available, and are used in novelty items and thermometers.

Fremin, in U.S. Pat. No. 4,919,983 teaches the use of thermochromic materials in the plastic forming a baby bottle. The purpose is to indicate when the contents of the baby bottle are too hot for the infant to drink.

None of the above inventions and patents, taken either singly or in combination, is seen to describe the instant invention as claimed.

Beer steins should ideally be made of a material which does not chemically taint the taste of the beer, which is mechanically suited to the needs of a stein, which is low in density so as not to be too heavy, and which insulates.

Many materials are too conductive of heat to be ideal beer stein materials, since an insulating beer stein will keep the beer cold much longer, will not drip condensed water from the air on humid days, and will be more comfortable.

Metal is commonly used for beer steins because it is mechanically ideal, being strong and tough. But metal is an inferior material chemically. An unpleasant metallic taste can result. Even relatively inert metals can taint the taste of beer. Many people are able to taste the difference between bottled and canned beer.

Metal is also quite heavy in some cases, and a poor thermal insulator.

Glass is chemically inert, but is easy to break. It is heavy, and only a moderately good insulator. Glazed (glass-coated) ceramics are much the same.

In addition to the considerations listed above, beer steins are difficult to adapt to inserts and emblems. Steins are sometimes painted, but traditional materials are either very tough (metal) or very brittle (ceramic, glass) and cannot be easily routed or grooved for an insert which would add visual stimulation to the stein.

Inserts would be a useful addition to a stein, because beer drinking is an indolent activity in which small diversions may be enjoyed and become the object of friendly discussion.

Accordingly, one object of the present invention is a beer stein which is light in weight, thermally insulating, physically strong and free of any tainting of the taste of beer in the stein.

Another object is a stein which imparts a slight pleasant aroma.

Still another object is a stein made of material which easily is routed to accept a visually stimulating insert.

A final object is a stein which contains an emblem or device responsive to environmental affects such as heat, motion, or the like.

These and other objects of the present invention will become readily apparent upon further review of the following specification and drawings.

SUMMARY OF THE INVENTION

The present invention is a beer stein made of wood and having an emblem or insert on the side which responds to environmental changes by changing its appearance. The wooden material imparts no taste to the beer, while giving off a faint pleasant aroma. The insert may be thermochromic, motion-responsive, or the like. For example, it may be of the hollow type which has a transparent window, contains liquid, and has small flakes in the liquid which swirl about when the insert is shaken. If thermochromic, it may respond to the temperature of the air, or that of the beer.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
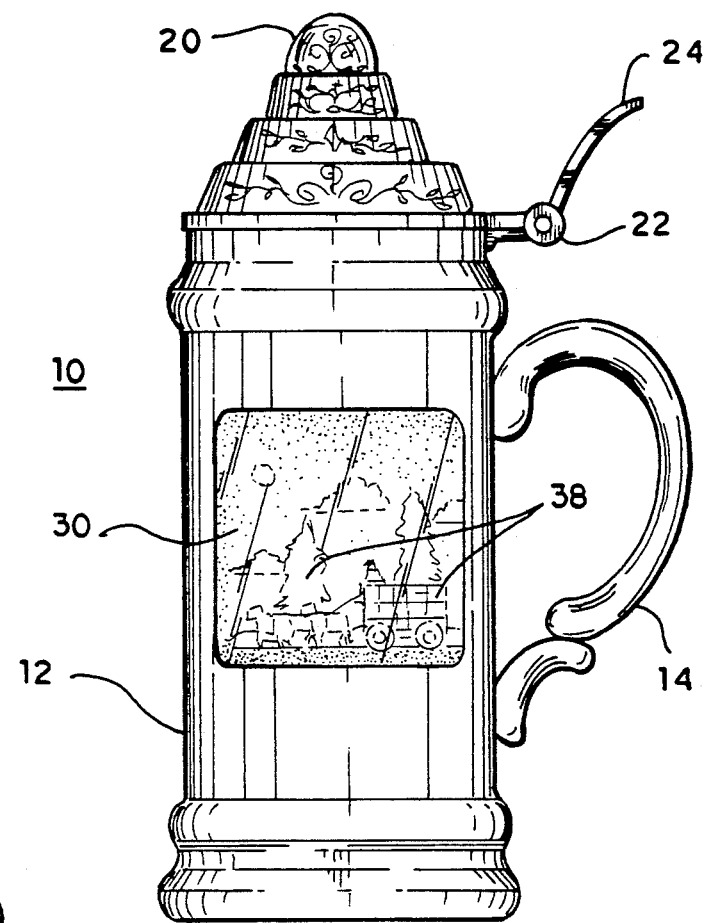
FIG. 1 is a side view of the beer stein of the present invention, showing the insert in elevational view.

The present invention, a beer stein 10, is shown in FIG. 1. The stein 10 includes a wooden vessel 12, a handle 14, and a lid 20 with a hinge 22 and a thumb lever 24. The lid 20, hinge 22, lever 24, and handle 14 may all be made of metal, ceramic, glass, wood, or any other material. The vessel 12 is made of wood.

Wood has numerous advantages for a stein. Its density, low thermal conductivity, mechanical strength, workability, and natural attractiveness are all advantages.

The wooden vessel 12 should not be finished on the inside, although it may be varnished, stained, or otherwise coated on the inside. The bare wood will not taint the taste of the beer, and the wood will give off a faint aroma which the beer drinker will smell when drinking, since the drinker's nose is inside the cavity of the vessel 12.

The wood used will preferably have a close and even grain, and a pleasant aroma. Since most woods have pleasant and distinct odors, there will be many choices for the species of wood used.

Figure 2:
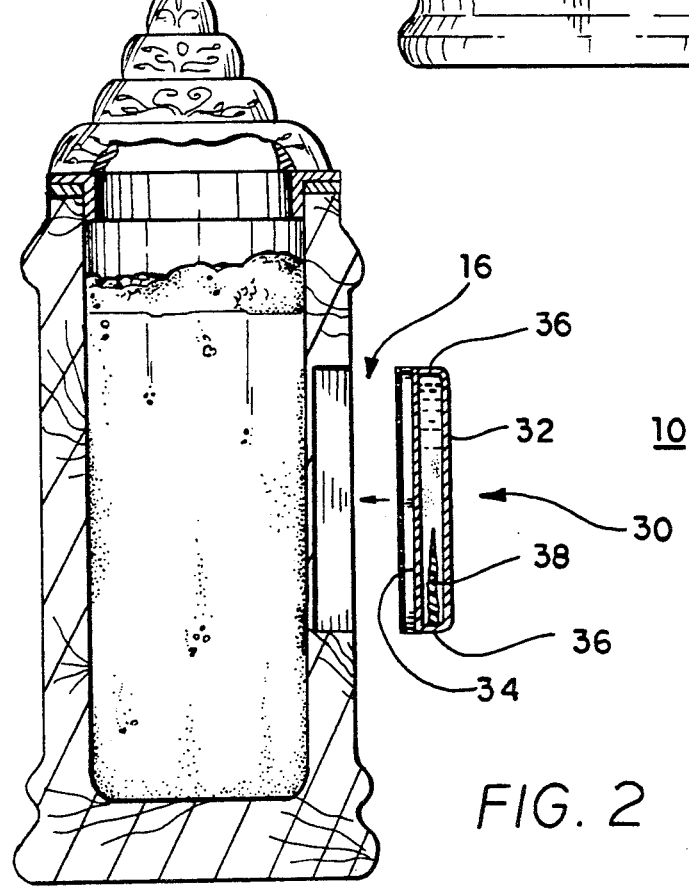
FIG. 2 is a frontal cross sectional partially exploded view showing the wooden material of the stein, beer within, and the insert exploded out of its routed recess.

An insert 30 is shown in both FIG. 1 and FIG. 2. The appearance is best shown in FIG. 1, and the structure in FIG. 2. The insert shown is of the hollow type having a transparent window 32, a back plate 34, side walls 36 and flattened or bas-relief FIGS. 38. The interior of the insert 30 is filled with a mixture 40 of liquid and flakes. The flakes are of nearly neutral density in the liquid, so that the flakes will swirl when the stein 10 is shaken, or lifted to the lips for a drink. In most cases the flakes will depict snow.

The figures may also be painted onto the interior surface of the back plate 34.

In FIG. 2, the insert 30 is shown exploded out of a routed depression 16 in the wooden side of the vessel 12. The back plate 34 of the insert 30 is curved to adapt to the curvature of the stein vessel 12. This curvature is visible in FIG. 2, where a portion of the back side of the back plate 34 is visible.

The insert may be glued into the depression 16 with epoxy or other strong glue which adheres to both wood and the material of the insert back plate 34 (usually a plastic).

Aside from the swirling flakes, the mixture 40 may contain immiscible liquids having different colors and densities, which, when the insert is moved, respond by creating slow wave motions. Bubbles can create a visual effect. Also, the figures inside may move.

The scene changes may be activated by heat as well as by motion. For example, the flakes, liquids interface, or other visible means may be visually changed by convection currents set up within the mixture 40. These convection currents could be driven by the temperature difference between the cold beer within and the warmer outside environment. In addition, the back plate 34 may be thermochromic to display various colors. The thermochromic materials may be chosen to selectively change the colors of images in a scene as beer is poured into the stein 10. They could change again as the beer gradually warms, or the level of the beer drops (causing two bands of color across the back plate 34 as seen through the window 32).

If this is desired, another construction may be used. The routed depression 16 may be made deep enough to penetrate through the wall of the vessel 12 so that the back plate 34 is in contact with the beer. This will permit the back plate 34 to quickly reach the temperature of the beer inside the vessel 12.

Care should be taken that the plastic or other material of which the back plate 34 is constructed, and the adhesive used, will not taint the beer. Also, precautions must be taken against leakage past the sides 36 of the insert 30.

The back plate 34 may be made flat, and the transparent front 32 curved. This will allow a deeper relief in the scene within, and simplify routing the depression 16 (since the routing cut can be made straight across the side of the vessel 12).

All of these visual changes are especially useful in a beer stein, because drinking beer usually occurs when people are in a state to be easily amused by such things as an environmentally responsive insert. This is because beer is drunk at social events, is associated with relaxation, and cause people to be easily amused.

It is to be understood that the present invention is not limited to the sole embodiment described above, but encompasses any and all embodiments within the scope of the following claims.

I claim:
1. A beer stein comprising:
   a hollow wooden vessel for holding liquids having an interior and including a bottom, a generally cylindrical side wall integral with said bottom, and a circular rim of said side wall distal said bottom defining an opening, said generally cylindrical side wall having an inner surface and an outer surface;
   a lid to cover said opening when in a closed position, said lid rotatably joined to said rim by a hinge having a hinge axis parallel to a tangent line of said rim for rotating said lid toward and away from said closed position;
   a lever extending from said lid for allowing exertion of a finger force to rotate said lid toward and away from said closed position;
   a handle fixed to said side wall for lifting said stein for drinking therefrom;
   a depression in said outer surface of said side wall, said depression being configured so as to leave said inner surface substantially undisturbed in shape; and
   an insert mounted in said depression, said insert configured to substantially fill said depression while generally maintaining an outer surface cylindrical configuration substantially parallel to said inner surface of said generally cylindrical side wall, said insert having a visual ornamental appearance and including means to respond to thermal changes by altering said ornamental appearance of said insert.

2. The stein according to claim 1, wherein said interior of said wooden vessel is unfinished.

3. The stein according to claim 1, wherein said insert includes thermochromic materials.

4. The stein according to claim 1, wherein said insert includes:
   a back plate proximal said depression having a back perimeter;
   a transparent window generally parallel to said back plate having a front perimeter;
   a connecting wall joining said back perimeter to said front perimeter and defining a space therewithin; which further includes
   means to respond to environmental changes by altering said ornamental appearance of said insert with a mixture held within said space, said mixture responsive to the environmental changes.

5. The stein according to claim 4 wherein said mixture includes flakes.

* * * * *